Sept. 18, 1928.   F. HAUPTMEYER   1,684,700
CASTING ARTICLES OF CORROSIONPROOF STEEL
Filed Jan. 26, 1927
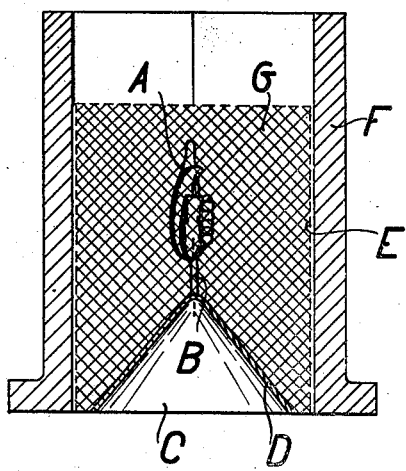
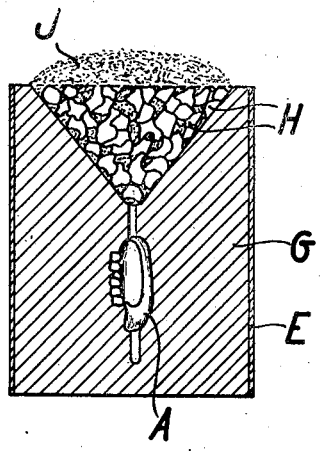
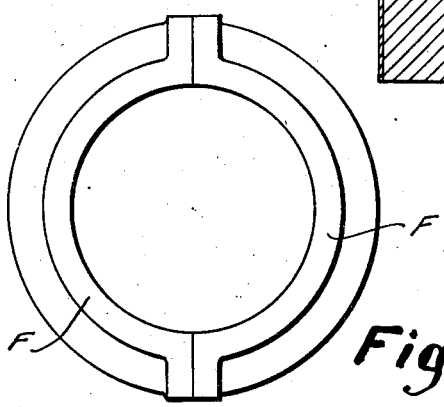
Inventor
Friedrich Hauptmeyer Patented Sept. 18, 1928.

1,684,700

UNITED STATES PATENT OFFICE.

FRIEDRICH HAUPTMEYER, OF ESSEN, GERMANY, ASSIGNOR TO FRIED. KRUPP AKTIENGESELLSCHAFT, OF ESSEN-ON-THE-RUHR, GERMANY.

CASTING ARTICLE OF CORROSIONPROOF STEEL.

Application filed January 26, 1927, Serial No. 163,768, and in Germany February 18, 1926.

My invention relates to a process for manufacturing moulded cast pieces, in particular thin walled pieces of complicated configuration, of corrosion-proof steel, e. g. of chromium-nickel steel having a slight admixture of silicon.

It has been considered hitherto as impossible to cast pieces of this character, e. g. of the well-known V2A-steel (a steel composed of about 20 per cent of Cr, 7 per cent of Ni, and 0.15 per cent of C) having a slight admixture of silicon. My invention offers a process for casting moulded pieces of the above-mentioned material and nature, this process substantially being characterized by the fact, that any action of oxygen and carbon upon the steel is prevented in the melting and casting operation.

The operation of moulding and casting a dental prosthesis of V2A-steel will be described in the following as a realization of the process forming the subject-matter of the invention and by way of example.

Fig. 1 is a longitudinal section of the mold before the pattern is removed,

Fig. 2 is a longitudinal section of the mold after removal of the pattern with the steel and flux in place ready for casting in, and Fig. 3 is a plan view of the two part iron mold into which the molding mass is packed.

Firstly a pattern A, see Fig. 1, of the prosthesis to be cast is made of a plastic material, such as a wax mass. This pattern is put on one of the points of a pin B having the shape to be seen from the drawing and the other point of which projects into a hollow conical steel body C, shown in Fig. 1 in elevational view, which is put on the work table. The outer shell surface of the body C is fitted with an envelope to which the moulding mass, hereinafter described, does not adhere, such as a sheet of tinfoil D. A cylindrical jacket E of gauze, pasteboard or sheet metal is then put around the body C carrying the pattern A, and a two-part iron casting mould F is put around the jacket E. The two part mold F is shown in Fig. 3 in a plan view. When these preparatory operations have been finished, the moulding mass G, which consists of clay (aluminium oxide) and water glass and is firstly in a liquid state, is filled cautiously into the jacket E, then shaken and rammed, while it successively grows solid. After solidification of the moulding mass G the two-part mould F is opened and removed.

Thereupon the mould G thus formed is dried and the body C together with the tinfoil D and pin B is withdrawn therefrom. In order to further remove the wax pattern A still present in the mould G, the latter is heated so that the wax mass flows out through the channel now leading from the pattern to the hollow space of the conical body C. As soon as the entire wax mass has flowed out, the mould is ready to receive the casting. Now the mould is heated to such an extent, that it begins to become red. Thereupon, with the mould G in the inverted position shown in Fig. 2, pieces H of V2A-steel are laid into the hopper previously formed by means of the body C, and are covered by a deoxidizing flux J, e. g. the so-called Sudal (a flux composed of chloride of calcium, chloride of lithium, fluoride of natrium, and chloride of zinc). Then the pieces H of V2A-steel are melted by means of a flame of oxyhydrogen gas the hydrogen of which abundantly outweighs the oxygen, so that the flame burns yellow. This nature of the flame as well as the slag of the flux covering the molten steel prevents an unfavourable action of the oxygen upon the V2A-steel. As soon as the steel, the admixture of silicon of which prevents spurting, has become completely liquid, the mould G is swung around an axis intersecting the longitudinal axis of the mold at right angles in a way such as to cause the molten steel to penetrate therein under the action of centrifugal force and thus to completely fill its hollow space. As the mould G is free from carbon, it is unable to influence the content of carbon of the steel and thus its insensibility to attacks of corroding agents.

After solidification the cast piece is cleaned by sand blast and polished. Any further finishing operation is not required, as even moulds of most minute configuration are filled exactly and sharply by the material when the casting process is carried out in accordance with the described process. A further advantage of my described process resides in the fact, that the cast pieces do not lose by this process their resistibility to corrosion.

What I claim as my invention and desire to secure by Letters Patent, is:—

1. In the process for manufacturing articles of corrosion-proof steel by melting the steel in an open receptacle and casting it in a mold, providing means for eliminating the influence of oxygen and carbon upon the steel during the melting and casting operation.

2. In the process for manufacturing articles of corrosion-proof steel by melting the steel by means of an open flame and casting it in a mold, providing means for eliminating the influence of oxygen and carbon upon the steel during the melting and casting operation.

3. In the process for manufacturing articles of corrosion-proof steel by melting the steel by means of an open flame and casting it in a mold, embedding the steel to be melted in a receptacle, covering the steel with a deoxidizing flux, melting it down and casting it through a closed channel in a closed mold, the walls of said receptacle, channel and mold consisting of a material, which is free from carbon.

4. In the process for manufacturing articles of corrosion-proof steel by melting the steel by means of an open flame and casting it in a mold, embedding the steel to be melted in a receptacle, covering the steel with a mixture of chloride of calcium, chloride of lithium, fluoride of natrium, and chloride of zinc, melting the steel down and casting it through a closed channel in a closed mold, the walls of said receptacle, channel and mold consisting of a material, which is free from carbon.

5. In the process for manufacturing articles of corrosion-proof steel by melting the steel by means of an open flame and casting it in a mold, embedding the steel to be melted in a receptacle, covering the steel with a deoxidizing flux, melting it down by means of an open oxyhydrogen flame and casting it through a closed channel in a closed mold, the walls of said receptacle, channel and mold consisting of a material, which is free from carbon.

6. In the process for manufacturing articles of corrosion-proof steel by melting the steel by means of an open flame and casting it in a mold, embedding the steel to be melted in a receptacle, covering the steel with a deoxidizing flux, melting it down by means of an open yellow burning oxyhydrogen flame and casting it through a closed channel in a closed mold, the walls of said receptacle, channel and mold consisting of a material, which is free from carbon.

The foregoing specification signed at Cologne, Germany, this 4th day of January, 1927.

FRIEDRICH HAUPTMEYER.